United States Patent
Mielenz

(10) Patent No.: US 11,409,297 B2
(45) Date of Patent: Aug. 9, 2022

(54) METHOD FOR OPERATING AN AUTOMATED VEHICLE

(71) Applicant: Robert Bosch GmbH, Stuttgart (DE)

(72) Inventor: Holger Mielenz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 97 days.

(21) Appl. No.: 16/679,397

(22) Filed: Nov. 11, 2019

(65) Prior Publication Data
US 2020/0201341 A1     Jun. 25, 2020

(30) Foreign Application Priority Data
Dec. 20, 2018  (DE) ..................... 10 2018 222 611.3

(51) Int. Cl.
| | | |
|---|---|---|
| *G05D 1/02* | (2020.01) | |
| *G05D 1/00* | (2006.01) | |
| *B60W 40/04* | (2006.01) | |
| *G06V 20/58* | (2022.01) | |

(52) U.S. Cl.
CPC ........... *G05D 1/0214* (2013.01); *B60W 40/04* (2013.01); *G05D 1/0088* (2013.01); *G06V 20/58* (2022.01); *B60W 2554/00* (2020.02); *G05D 2201/0213* (2013.01)

(58) Field of Classification Search
CPC ................... G06K 9/00805; G05D 2201/0213
See application file for complete search history.

(56) References Cited

U.S. PATENT DOCUMENTS

| | | | |
|---|---|---|---|
| 9,868,391 B1 * | 1/2018 | Fairfield | B60W 30/08 |
| 10,988,110 B1 * | 4/2021 | Patnaik | B60R 25/31 |
| 2018/0004213 A1 * | 1/2018 | Absmeier | H04L 67/104 |

(Continued)

FOREIGN PATENT DOCUMENTS

| | | | | |
|---|---|---|---|---|
| CN | 108292356 A | * | 7/2018 | ............ B60Q 1/268 |
| DE | 10 2015 220 360 A1 | | 4/2017 | |

(Continued)

OTHER PUBLICATIONS

Zardosht et al., "A Predictive accident-duration based Decision making module for rerouting in environments with V2V communication", Nov. 2017, ScienceDirect (Year: 2017).*

(Continued)

*Primary Examiner* — Peter D Nolan
*Assistant Examiner* — Kenneth M Dunne
(74) *Attorney, Agent, or Firm* — Maginot, Moore & Beck LLP

(57) ABSTRACT

The disclosure describes a method for operating an automated vehicle comprising: receiving environmental data; ascertaining a driving area that is to be traveled on by the vehicle, and a prohibited area that is not to be traveled on by the vehicle, based on the environmental data; determining whether a bottleneck exists in which the driving area is in an at least partially blocked state by a further road user or an obstacle, such that it is not possible, exclusively using the driving area, for the automated vehicle and/or the further road user to pass or for the automated vehicle to pass by the obstacle; ascertaining a trajectory in which the vehicle at least partially uses the prohibited area if a bottleneck exists; and emitting an actuation signal for operating the automated vehicle based on ascertained trajectory.

14 Claims, 3 Drawing Sheets

(56) References Cited

U.S. PATENT DOCUMENTS

| | | | | |
|---|---|---|---|---|
| 2018/0147988 A1* | 5/2018 | Lee | ................... | G01C 21/3685 |
| 2018/0326982 A1* | 11/2018 | Paris | ...................... | G08G 1/166 |
| 2018/0329428 A1* | 11/2018 | Nagy | ................... | G05D 1/0088 |
| 2018/0345963 A1* | 12/2018 | Maura | ................... | G05D 1/0223 |
| 2019/0220016 A1* | 7/2019 | Phillips | .................. | G01C 21/20 |
| 2019/0291728 A1* | 9/2019 | Shalev-Shwartz | ........................... | |
| | | | | B60W 60/00272 |
| 2020/0242920 A1* | 7/2020 | Pfadler | ................ | G05D 1/0027 |
| 2021/0094539 A1* | 4/2021 | Beller | ...................... | B60Q 1/50 |
| 2021/0132604 A1* | 5/2021 | Gillett | ....................... | B25J 9/08 |
| 2022/0063661 A1* | 3/2022 | Passa | .................... | G06V 20/58 |

FOREIGN PATENT DOCUMENTS

| | | | | | |
|---|---|---|---|---|---|
| JP | | 2020504860 | * | 2/2020 | ............... G08G 1/16 |
| WO | WO-2016159170 A1 | * | 10/2016 | ......... B62D 15/0255 |

OTHER PUBLICATIONS

Fang Zong, "Predicting Severity and Duration of Road Traffic Accident", 2013, Mathematical Problems in Engineering (Year: 2013).*

* cited by examiner

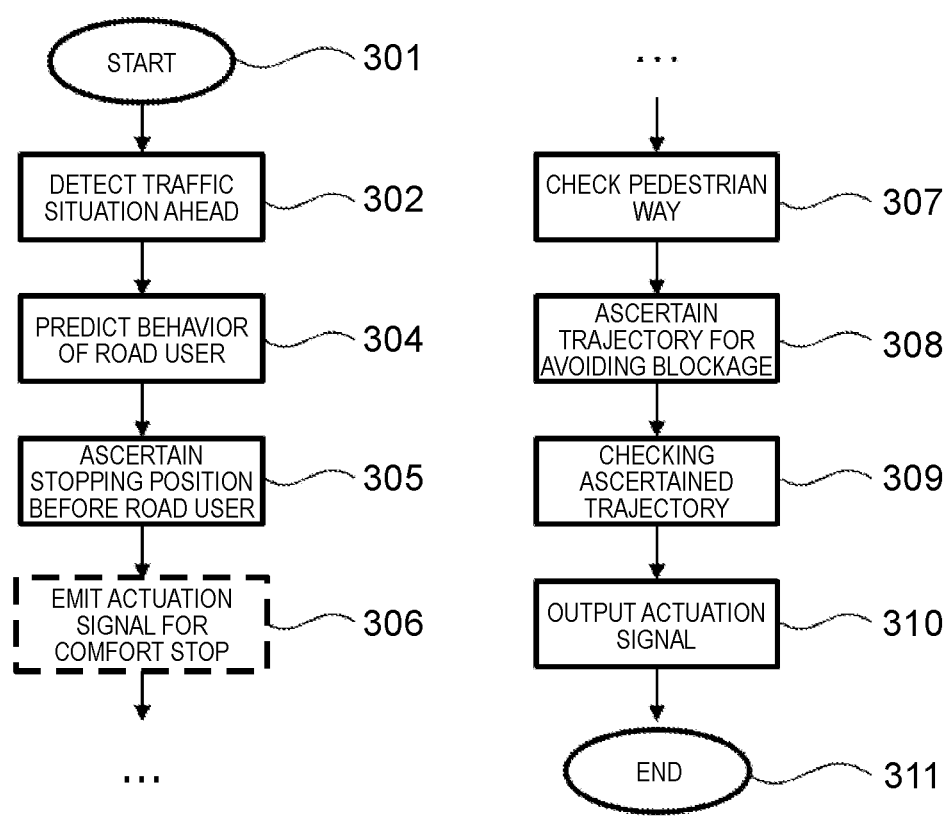

METHOD FOR OPERATING AN AUTOMATED VEHICLE

This application claims priority under 35 U.S.C. § 119 to application no. DE 10 2018 222 611.3, filed on Dec. 20, 2018 in Germany, the disclosure of which is incorporated herein by reference in its entirety.

TECHNICAL FIELD

The disclosure relates to a method for operating an automated vehicle, to a device which is configured to execute the method, to a computer program for executing the method and to a machine-readable storage medium on which this computer program is stored.

BACKGROUND

Methods for ascertaining trajectories for automated vehicles are known from the prior art.

DE 10 2015 220 360 A1 presents, for example, a method for generating a signal for changing a partially automated or highly automated vehicle into a safe system state in a target pose. In this context, the following method is executed: ascertaining at least one target pose, ascertaining travel trajectories from the current vehicle position to the at least one target pose, evaluating the travel trajectories, selecting one of the travel trajectories on the basis of the evaluation which is carried out, and generating the signal on the basis of the selected travel trajectory.

SUMMARY

The disclosure describes a method for operating an automated vehicle, comprising the following steps:
  receiving environmental data;
  ascertaining a driving area which is provided to be traveled on by the vehicle which is embodied, in particular, as a passenger car, truck or bus, and a prohibited area which is provided not to be traveled on by the vehicle, on the basis of the environmental data;
  determining whether the driving area is in an at least partially blocked state or becomes blocked by a further road user and/or an obstacle, so that a bottleneck exists and/or is produced in which it is not possible for the vehicle and the road user to pass, and/or it is not possible for the vehicle to pass by the obstacle by exclusively using the driving area;
  ascertaining and/or receiving a trajectory in which the vehicle at least partially uses the prohibited area when traveling along the trajectory if a bottleneck has been determined;
  emitting an actuation signal for operating the automated vehicle on the basis of the ascertained trajectory.

An automated vehicle or a vehicle which is operated in an automated fashion can be understood to be a vehicle which is operated in a partially automated, highly automated or fully automated fashion. In particular, the automated vehicle can be a vehicle which is operated in a driverless fashion and which can be operated at least partially without human intervention. The vehicle may be, for example, a classic passenger car, a truck or a minibus. Furthermore, the vehicle may also be a different type of vehicle, such as a two-wheeled or three-wheeled vehicle. It can also be a special vehicle, such as an ambulance, a garbage truck, a cleaning vehicle or vehicle for the automated tending of plants.

An obstacle can be any type of object, damage or blockage of a certain area, in particular of areas which are normally provided to be traveled on by vehicles. Obstacles may be, for example, branches, trees, stones or the like. Other vehicles may also constitute an obstacle. For example, roadworks can form an obstacle and/or vehicles which are necessary for roadworks, such as excavators, loaders, cranes, rollers, etc. Vehicles, such as sewer cleaning vehicles which are parked for relatively long time periods can also constitute an obstacle. An obstacle can also be understood to be parked vehicles which block part of an area which is provided to be traveled on.

Further road users can be understood to be all known types of oncoming vehicles such as passenger cars, trucks, buses, light trucks, excavators, tractors, motorcycles, quad-bikes, three-wheeled vehicles and the like. These vehicles can be powered in any desired fashion.

A driving area which is provided to be traveled on by the vehicle is understood to be a driving area which is available to the vehicle as a movement area and potentially as a free area. This includes, in particular, the driver's own lane and, under certain circumstances, also a lane for oncoming vehicles if this lane can be used to be traveled on according to the country-specific laws. In Germany, if there is no overtaking sign provided, the oncoming traffic could use the lane to travel around obstacles and for overtaking. Consequently, this lane is, under certain circumstances, also available as a driving area. In particular, the driving area can consequently be an area which, according to regional regulations and laws, is permitted to be traveled on legally. Furthermore, in particular the areas which are provided to be traveled on are understood to be only the driver's own lane.

The prohibited area may be an area which is not permitted to be traveled on legally. For example, the prohibited area may be a sidewalk which, according to the current highway traffic regulations (as at Dec. 19, 2019) is not to be traveled on by vehicles in Germany. Sidewalks could also be counted as part of the prohibited area in which it is not permitted to park on the sidewalk as a result of appropriate signage. Further examples of prohibited areas may be cycle paths, breakdown lanes, lanes for oncoming traffic which are separated from the lane provided for the vehicle by one or two continuous lines, and/or green areas at the edge of a road. Differences may arise here depending on the regional authority.

The determination as to whether the vehicle can pass the obstacle or a further road user or whether the further road user can pass the vehicle can be carried out here by taking into account a safety distance which is to be complied with. This distance may be adapted as desired depending on the vehicle and, if appropriate, depending on the customer's or vehicle occupant's desires. The safety distance can be selected to be, in particular, greater than 30 cm, more particularly greater than 15 cm, more particularly greater than 10 cm, and more particularly greater than 5 cm.

If it is ascertained that the driving area which is available to be traveled on, if appropriate taking into account a safety distance, is not sufficiently wide for the vehicle to be able to travel past the further road user or the obstacle, it is not possible to pass the obstacle or the further road user. If it is ascertained that the driving area of the further road user, which is available for the further road user if appropriate taking into account a safety distance, is not sufficiently wide for the further road user to be able to travel past the vehicle, it is consequently not possible for the further road user to pass the vehicle.

The environmental data may be acquired, for example, by vehicle-mounted sensors such as external cameras, radar sensors, lidar sensors and/or ultrasonic sensors. These data can subsequently be received, for example, by a control unit on which the method runs. The environmental data can also represent data from sensors of further vehicles and/or infrastructure installations. Furthermore, the environmental data can be data from an external server.

In the ascertaining or receiving step, a trajectory can either be ascertained on the basis of the received environmental data or received from an external source. This external source may be, for example, an external computer or a cloud which is designed to ascertain corresponding trajectories. The trajectory can also be made available by a tele-operator who ascertains this trajectory in a corresponding device and transmits it to the vehicle. A received trajectory may also be understood in this case to be live control by the one tele-operator.

The fact that the vehicle at least partially uses the prohibited area when traveling can mean that the vehicle travels at least partially on the prohibited area, for example with one or more tires or that at least part of the bodywork projects into the prohibited area (for example a mirror or part of the engine hood).

The emitted actuation signal serves to operate the automated vehicle on the basis of the ascertained trajectory. The operation, in particular a process of performing lateral and/or longitudinal control of the vehicle can be carried out either directly or indirectly by means of further elements such as additional control units, signal converters or the like.

This method can run, for example, on a control unit of an automated vehicle. Alternatively, the method can also run on an external server which transmits the actuation signal to the vehicle. The method does not necessarily have to run on a single device which is located at one location but rather can also be executed in parts on a plurality of positionally separate devices.

This method provides the advantage that critical traffic situations and blockage situations can be avoided by automated vehicles. In addition, the value of automated vehicles and of services which they are used to offer rises if the systems function well and reliably. As a result of the fact that long stopping pauses are avoided, unpleasant situations are avoided for the passengers of automated vehicles.

In a further embodiment of the method, said method comprises the additional step of ascertaining lanes in the driving area on the basis of the received environmental data. In particular, in each case at least one lane is associated with the vehicle and/or the obstacle and/or the further road user on the basis of this ascertaining process.

This embodiment of the method has the advantage that improved analysis of the present driving situation is possible.

In a further embodiment of the method, in the determining step, the width of the driving area which is available to be traveled on by the vehicle and/or by the further road user is ascertained.

On the basis of this width and the width of the driver's own vehicle or the width which is ascertained and/or received on the basis of the environmental data (for example via Car2Car communication) of a further road user it can easily be ascertained whether it is possible to pass or drive past, by using the available driving area. A safety distance can also be included in the calculation for this ascertaining process.

In a further embodiment of the method, the determination as to whether the driving area is in an at least partially blocked state or becomes at least partially blocked by a further road user and/or an obstacle is carried out on the basis of a sensed contour of the obstacle and/or of the further road user.

The contour is ascertained here, in particular, on the basis of the environmental data. For example classification algorithms can be used for this. The process of ascertaining whether there is a bottleneck can be carried out efficiently and reliably by determining a contour and comparing the contour with the available driving area.

The received environmental data can comprise sensor data acquired by sensors of the vehicle and/or of at least one further vehicle and/or of an infrastructure installation.

This embodiment of the disclosure provides the advantage that it is possible to have recourse to sensor data of the driver's own vehicle and to sensor data which have not been recorded by a sensor system of the vehicle in question. As a result, it is possible to determine driving areas and prohibited areas better and to ascertain bottlenecks better. Sensor data of infrastructure installations can be understood to be, for example, sensors which are mounted on buildings, pillars, street lamps, road signs, bridges or further infrastructure installations. The sensors may be, for example, cameras, radar sensors, lidar sensors and/or ultrasonic sensors. The sensor data which are acquired by the vehicle or further vehicles may be, for example, sensor data of an external camera or of radar sensors, lidar sensors and/or ultrasonic sensors or GPS or GNSS sensors.

In a further embodiment of the method, the environmental data are received by a server and comprise, in particular, map information.

This embodiment of the disclosure provides the advantage that it is possible to have recourse to aggregated sensor data or information. Data from a wide variety of sources can be aggregated on the server, for example data from further vehicles, aircraft, helicopters, infrastructure installations or satellite data. If map data are received, they can be used directly to ascertain the lanes and to determine more precisely whether a bottleneck is produced or will be produced. Furthermore, the map data can already comprise important messages about driving areas and prohibited areas which are present. It is also possible to receive information about national or regional laws or regulations which can be used to determine prohibited areas and driving areas.

In a further embodiment of the method, said method comprises the additional step of predicting the movement of the further road user, wherein the determination, the acquisition of the trajectory and/or the emission of the actuation signal occur on the basis of the predicted movement.

The prediction can be carried out here, in particular, on the basis of at least one further parked vehicle and/or obstacle which is located at the edge of the roadway. Such messages can indicate that an oncoming vehicle will bring about a bottleneck in the immediate future. If the speed of an oncoming road user and the road user's current relative position with respect to the obstacles or vehicles located at the edge of the roadway is ascertained, it is possible to ascertain on the basis of these values whether the vehicle can still come to a standstill before the obstacles (on the basis of assumptions regarding the deceleration of the road user). If this is not the case, it can be ascertained on the basis of a determined width of the road user and the width of the vehicle and the width of the driving area available for both vehicles, whether a bottleneck will be produced or how probable the production of a bottleneck is. In this case, for example a stopping maneuver can be initiated early.

In a further embodiment of the method, said method comprises the additional step of emitting a blockage signal if the determination reveals that a bottleneck exists and/or is produced.

The blockage signal can contain here either only the information that a bottleneck is present or can contain further details about the present traffic situation such as received environmental data or analyses based on the environmental data such as detected objects or roadways and bottlenecks. In addition, the blockage signal can also comprise the ascertained trajectory.

The blockage signal can be received, for example, by a server which checks the received data and makes a specification regarding further travel on the basis thereof. For example, a trajectory can be determined on the server and subsequently transferred back to the vehicle. It is also possible to carry out checking and enabling of the received trajectory so that the vehicle receives just one enable signal from the server. The server is equipped here in particular with better hardware than the vehicle and has more computing power. The checking and calculations on the server can be performed, for example, by AI.

Alternatively or additionally, a determination of a trajectory or the check of a received trajectory can also be carried out by a tele-operator, that is to say a specialist who checks the received data and/or if appropriate even intervenes actively in the control of the vehicle. Said tele-operator can also generate an enable signal which is received in the vehicle and enables or triggers the step of emitting the trajectory for controlling the vehicle.

In a further embodiment of the method, said method comprises the additional step of ascertaining a stopping position before the obstacle and/or the further road user and before emitting a stop signal for carrying out a stopping maneuver of the vehicle at the ascertained stopping position.

If there is uncertainty as to whether a prohibited area may be used at least partially by the vehicle, a certain time may be necessary to obtain a permit or more precise analysis. For this, the vehicle may drive to a stopping position and stay in said position until the situation has been clarified. For example, when stopping occurs an enquiry can be sent to an external server or a tele-operator in order to obtain clearance for an ascertained trajectory or to receive a trajectory on the basis of an enquiry.

In a further embodiment of the method, said method comprises the additional step of detecting further road users located in the prohibited area, in particular pedestrians and/or cyclists, wherein the trajectory is ascertained on the basis of this detection.

This embodiment of the disclosure provides the advantage that the safety for all road users is increased. Depending on a detection of further road users it is possible to make a decision as to whether a prohibited area can be used or a trajectory can be adapted, or a decision as to whether contact should be made with an external source. If, for example, pedestrians are located on a pedestrian way, this cannot be used to be traveled on by the vehicle in the time in which the pedestrians are present. The same applies, for example, to cycle paths or lanes for oncoming traffic which are separated off from the lane provided for the vehicle by one or two continuous lines. Precise analysis of the oncoming traffic takes place with respect to these lanes. In the case of oncoming traffic it is not possible to use these prohibited zones.

Generally, prohibited areas which are not permitted for use by corresponding vehicles are released for temporary use in exceptional situations. This may be, for example, when there are roadworks present or accidents have occurred. The method may therefore also additionally comprise a step of receiving a special permit in which the use is enabled by an official authority, such as the traffic police. This signal can also be captured, for example, by means of an environmental sensor system of the vehicle and received by the vehicle in the form of the environmental data. For example, a movement of a traffic policeman could constitute such an enable signal.

In a further embodiment of the method, said method comprises the additional step of estimating an anticipated duration of the existence of the bottleneck, wherein the trajectory is ascertained on the basis of this estimation.

In this embodiment, on the basis of the environmental data or further received signals, it is estimated or ascertained how long the present blockage situation is still expected to exist. For example, said situation can be produced by a garbage truck or cleaning vehicle which will move on within a foreseeable period of time and resolve the blockage situation. In particular, a trajectory which uses a prohibited area is not ascertained if the estimated duration undershoots a predefined threshold value. The latter can be fixed at less than one minute, in particular less than 30 s. An estimation is carried out, for example, on the basis of a classification of the cause of the bottleneck and reading out of typical durations which are produced in the case of blockage by the classified cause. In the case of a garbage truck, for example an average duration for a defined distance traveled can be assumed and the estimation can be produced on the basis of this assumption.

In addition, a device, in particular a control unit or a computer, is disclosed which is configured to execute the method on which this disclosure is based. The device may also be a computer which is, for example, part of a service cluster.

For this purpose, the device can have at least one computing unit for processing signals or data, at least one memory unit for storing signals or data, at least one interface with access to a sensor or an actuator for reading sensor signals from the sensor or for outputting data signals or control signals to the actuator and/or at least one communication interface for reading in or outputting data which are embedded in a communication protocol. The computing unit can be, for example, a signal processor, a microcontroller or the like, wherein the memory unit can be a flash memory, an EEPROM or a magnetic memory unit. The communication interface can be designed to read in or output data in a wireless fashion and/or line-bound fashion, wherein a communication interface can read in or output the line-bound data, and can read these data in, for example electrically or optically, from a corresponding data transmission line or output them into a corresponding data transmission line.

Device may be understood here to mean an electrical unit which processes sensor signals and outputs control signals and/or data signals in accordance therewith. The device can have an interface which can be embodied in the form of hardware and/or software. In the case of a hardware embodiment, the interfaces may be, for example, part of a so-called system ASIC which includes a wide variety of functions of the device. However, it is also possible for the interfaces to be separate integrated circuits, or to be composed at least partially from discrete components. In the case of a software embodiment, the interfaces may be software modules which are provided, for example, on a microcontroller along with other software modules.

A computer program product or computer program with program code which can be stored on a machine-readable carrier or storage medium such as a semiconductor memory, a hard disk memory or an optical memory and is used to carry out, implement and/or actuate the steps of the method according to one of the embodiments described above is also advantageous, in particular if the program product or program is executed on a computer or a device.

A corresponding computer program and a machine-readable storage medium on which this computer program is stored are also disclosed.

BRIEF DESCRIPTION OF THE DRAWINGS

Exemplary embodiments of the disclosure are presented in the drawings an are explained in more detail in the description below.

In the drawings:

FIG. 3 shows a further schematic method diagram.

DETAILED DESCRIPTION

In already applied methods for longitudinal and lateral guidance in an automated traveling vehicle, usually a comfort controller is tailored to static and dynamic objects which participate in traffic on a regular basis. The focus here is on trajectory planning within designated roadways. Therefore, in the event of a blockage situation lying ahead a currently known system would not be able to resolve the traffic situation beyond a further oncoming road user (bus, garbage truck and the like) or else a car which is possibly parked within a blockage configuration for a relatively long time (e.g. for sewer cleaning) and brake an automated vehicle in which the vehicle runs comfortably to a stationary state before the blockage situation.

The object of the disclosure in the following exemplary embodiments is therefore to detect and resolve such blockage situations in an automated fashion by means of corresponding actuation of an automated vehicle. For this, the vehicle can either clear a sufficient part of its own lane for a possibly oncoming vehicle by traveling onto a sidewalk lying parallel or onto some other prohibited zone, and allowing the oncoming vehicle to pass, or it can travel past a car which has been parked for a long time or similar obstacle which is blocking part of the travel lane which is provided for the automated vehicle to traveled on, in that the missing area of the travel lane which is provided is covered by part of the pedestrian way or some other prohibited zone.

Figure 1:
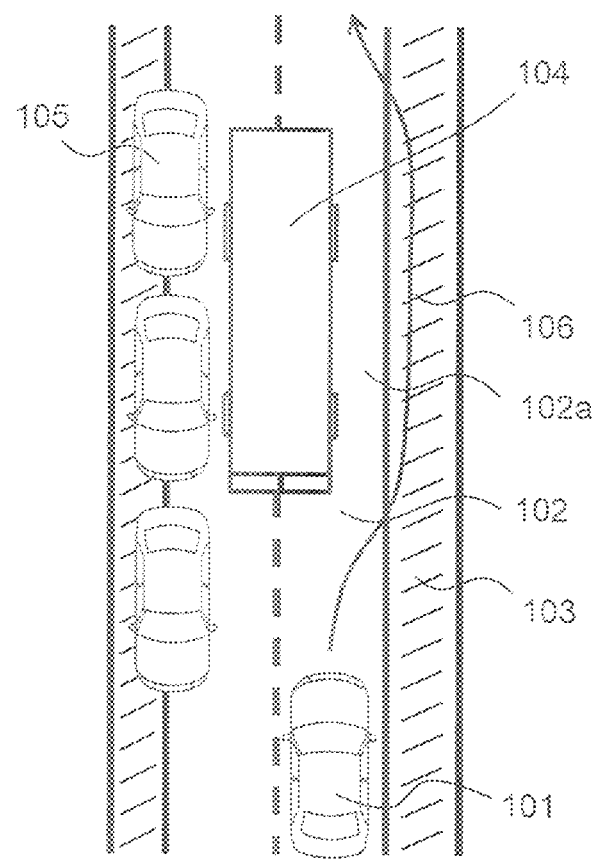
FIG. 1 shows an exemplary driving situation.
Figure 2:
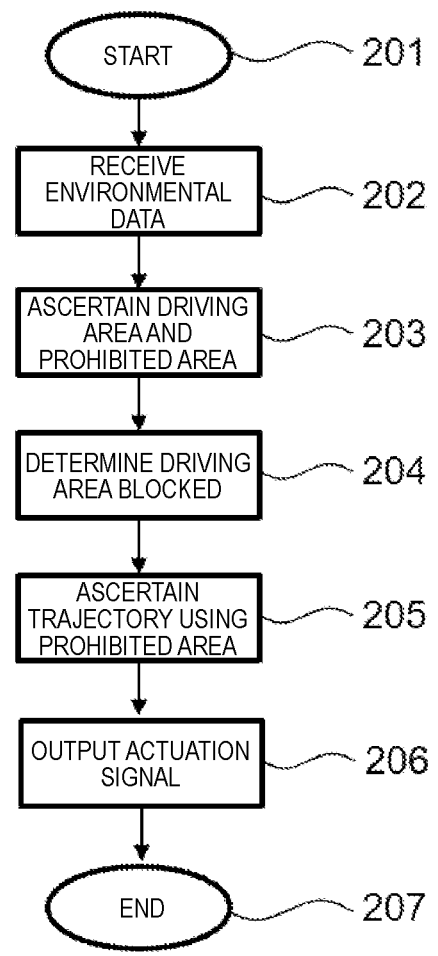
FIG. 2 shows a schematic method diagram.

FIG. 1 illustrates a traffic situation of a first exemplary embodiment. A vehicle 101 which is operated in an automated fashion is located on a lane which is provided for this vehicle and which represents a driving area 102 which is provided to be traveled on by the vehicle 101. The driving area 103 for the vehicle 101 is made narrower by an oncoming bus 104, so that a bottleneck 102a is formed. This bottleneck 102a is not wide enough for the vehicle 101 to steer past the bus in an automated fashion exclusively using the driving area 102. The driving area of the bus is also not wide enough for the latter to be able to pass the vehicle 101 in its current position. In this exemplary embodiment the bottleneck 102a is produced by virtue of the fact that further vehicles 105 which make the driving area for oncoming road users narrower are parked at the edge of the roadway. If neither the vehicle 101 nor the bus 104 can travel in reverse, for example owing to further road users behind the vehicle 101 and the bus 104, a blockage situation occurs which can cause the roadway to become blocked and can consequently bring about a traffic jam. In order to resolve this blockage situation, in this exemplary embodiment a trajectory 106 is ascertained which, in addition to the driving area 102 provided to be traveled on by the vehicle 101, takes into account a prohibited area 103, located next to the driving area, in the form of a sidewalk (hatched area on both sides of the road). The method illustrated in FIG. 2, which starts in step 201, runs here in a control unit installed in the vehicle 101.

In step 202, environmental data are received by the control unit. These have been acquired in this exemplary embodiment by environmental sensors of the vehicle 101, comprising a plurality of vehicle cameras, microphones, lidar sensors, radar sensors and ultrasonic sensors.

In step 203, the driving area 102 which is provided to be traveled on by the vehicle 101 and a prohibited area 103 which is provided not to be traveled on by the vehicle 101, in the form of the sidewalk, are ascertained on the basis of the environmental data. Current classification methods are used for this, it being possible to use said methods to determine free areas.

In step 204 it is determined that the driving area 103 is at least partially blocked by the bus 104, so that there is a bottleneck 102a in which it is not possible for the vehicle 101 and the bus 104 to pass by exclusively using the driving area 103 or the driving area of the bus 104. In this context, the width of the bottleneck 102a is ascertained and this is compared with the width of the vehicle including a safety distance of 10 cm. Since the bottleneck 102a in this exemplary embodiment is narrower than the width of the vehicle plus the safety distance, the vehicle 101 cannot pass through the bottleneck 102a by exclusively using the driving area 103. In addition, in this exemplary embodiment the width of the bus 104 and the width of the driving area which is available to the bus are ascertained and it is detected, by taking into account a safety distance, that the available driving area of the bus is also too narrow for the bus to be able pass the vehicle.

In step 205, after the determination of the bottleneck 102a or blockage situation which is present, a trajectory 106 is ascertained at which the vehicle 101 at least partially uses the prohibited area 103 when the trajectory 106 is traveled along. In this exemplary embodiment, the trajectory 106 leads the vehicle 101 at least partially over the sidewalk, which is used at least with two wheels of the vehicle 101.

In step 206, an actuation signal is output by the control unit. Lateral and longitudinal control of the vehicle 101 occur along the ascertained trajectory 106 on the basis of the actuation signal.

The method ends in step 207.

In a further exemplary embodiment, the method comprises the additional step of detecting further road users, in particular pedestrians, wheelchair users, children and cyclists in the prohibited area 103 and on the sidewalk. The trajectory 106 is ascertained in accordance with this detection.

In a further exemplary embodiment, the method which is illustrated in FIG. 3 and which starts in step 301 runs on a further automated vehicle.

In step 302, a traffic situation lying ahead is detected. In this exemplary embodiment it is detected that such a wide part of the roadway which is provided for the vehicle is blocked by an oncoming road user and a parked vehicle. For this detection, detected environmental objects are associated with the lanes. The lanes are acquired here by means of received map information and data from an onboard sensor system of the vehicle. In order to ascertain that the lane lying ahead is blocked by the oncoming road user, a contour of the road user is additionally ascertained and an overlap with the lane provided for the vehicle is detected. This detection is carried out by ascertaining the width of a remaining free area on the lane provided for the vehicle.

In step 304, the behavior of the road user is predicted. In this exemplary embodiment it is ascertained that the road user is traveling on the lane of the vehicle, since said road user itself is avoiding an obstacle on its lane. Therefore, further obstacles which are located at the edge of the road are checked to determine whether, when the road user travels further, it will also always require the lane of the vehicle. Both a contour of the road user which is ascertained by means of sensor data of the onboard sensor system, a contour of the obstacles, for example in the form of vehicles parked at the edge of the road, plus a safety distance, are used for this detection.

In step 305, a stopping position before the road user is ascertained. The stopping position is ascertained by taking into account a prediction of the behavior of the road user and by complying with comfort conditions for the occupants of the vehicle. In addition, a safety distance which is to be maintained between the vehicle and the road user is ascertained so that the vehicle can travel through a prohibited area, for example a pedestrian way, without multiple maneuvers. In this exemplary embodiment, a minimum distance of 1 m from the further road user is therefore assumed for the stopping position.

In step 306, an actuation signal for converting a comfort stop is optionally emitted on the basis of the ascertained stopping position.

In step 307, a pedestrian way which runs alongside the provided roadway is checked for travel by the vehicle. For this, further road users, in particular pedestrians, on the pedestrian way are ascertained by means of the onboard sensor system of the vehicle, which comprises a plurality of vehicle cameras. In this exemplary embodiment, the pedestrian way which runs alongside is ascertained by means of received data of a digital map and on the basis of an evaluation of a classification method which analyzes the environmental data of the onboard sensor system.

In step 308, a trajectory for avoiding the blockage situation using the pedestrian way which runs alongside is ascertained. In this context, the width of the pedestrian way is determined. In addition, the necessary area which is to be traveled over is ascertained. In this context, the width of the vehicle, the width of the remaining driving area and optionally provided safety distances are included in the calculation (vehicle width minus width of the remaining driving area plus safety distance). The ascertained trajectory is determined within the area which is ascertained in this way.

In step 309, the ascertained trajectory is checked and cleared. This is done by taking into account the acquisition of further pedestrians on the pedestrian way by means of the onboard sensor system of the vehicle. The enabling is additionally carried out by means of a received enable signal which has been emitted by a tele-operator. The latter tests the ascertained trajectory which includes the pedestrian way and enables it.

In step 310, an actuating signal is output. The vehicle is actuated along the ascertained trajectory on the basis of the actuation signal.

The method ends in step 311.

What is claimed is:

1. A method for operating an automated vehicle, the automated vehicle being one of a passenger car, a truck, and a bus, the method comprising:
   receiving environmental data;
   ascertaining, based on the environmental data, (i) a driving area that is provided to be traveled on by the automated vehicle and (ii) a prohibited area that is provided not to be traveled on by the automated vehicle;
   determining whether a bottleneck exists in which the driving area is in an at least partially blocked state by one of a further road user and an obstacle, such that one of (i) it is not possible for the automated vehicle and the further road user to pass exclusively using the driving area and (ii) it is not possible for the automated vehicle to pass by the obstacle exclusively using the driving area;
   classifying a cause of the bottleneck;
   estimating an anticipated duration of the bottleneck based on the cause of the bottleneck;
   ascertaining a trajectory in which the automated vehicle at least partially uses the prohibited area when traveling along the trajectory in response to determining that the bottleneck exists and the anticipated duration exceeds a predefined threshold value; and
   operating the automated vehicle based on the ascertained trajectory.

2. The method according to claim 1 further comprising:
   ascertaining lanes in the driving area based on the received environmental data.

3. The method according to claim 2 further comprising:
   associating at least one of (i) the automated vehicle, (ii) the obstacle, and (iii) the further road user with at least one respective lane of the ascertained lanes.

4. The method according to claim 1, the determining whether the bottleneck exists further comprising:
   ascertaining a width of the driving area that is available to be traveled on by at least one of the automated vehicle and the further road user.

5. The method according to claim 1, the determining whether the bottleneck exists further comprising:
   determining whether the bottleneck exists based on at least one of a sensed contour of the obstacle and a sensed contour the further road user.

6. The method according to claim 1, wherein the environmental data includes sensor data acquired by at least one of (i) sensors of the automated vehicle, (ii) sensors of at least one further vehicle, and (iii) sensors of an infrastructure installation.

7. The method according to claim 1, wherein the environmental data are received by a server and include map information.

8. The method according to claim 1, further comprising:
   predicting a movement of the further road user,
   wherein at least one of (i) the determining whether the bottleneck exists and (ii) the ascertaining the trajectory is based on the predicted movement.

9. The method according to claim 1, further comprising:
   emitting a blockage signal in response to determining that the bottleneck exists.

10. The method according to claim 1, wherein:
the ascertaining of the trajectory includes ascertaining a stopping position in advance of at least one of (i) the obstacle and (ii) the further road user; and
the operating of the automated vehicle includes operating the automated vehicle to carry out a stopping maneuver at the stopping position.

11. The method according to claim 1 further comprising:
detecting further road users located in the prohibited area, the further road users being at least one of pedestrians and cyclists,
wherein the trajectory is ascertained based on the detecting of the further road users located in the prohibited area.

12. A device for operating an automated vehicle, the automated vehicle being one of a passenger car, a truck, and a bus, the device configured to:
receive environmental data;
ascertain, based on the environmental data, (i) a driving area that is provided to be traveled on by the automated vehicle and (ii) a prohibited area that is provided not to be traveled on by the automated vehicle;
determine whether a bottleneck exists in which the driving area is in an at least partially blocked state by one of a further road user and an obstacle, such that one of (i) it is not possible for the automated vehicle and the further road user to pass exclusively using the driving area and (ii) it is not possible for the automated vehicle to pass by the obstacle exclusively using the driving area;
classify a cause of the bottleneck;
estimate an anticipated duration of the bottleneck based on the cause of the bottleneck
ascertain a trajectory in which the automated vehicle at least partially uses the prohibited area when traveling along the trajectory in response to determining that the bottleneck exists and the anticipated duration exceeds a predefined threshold value; and
operate the automated vehicle based on the ascertained trajectory.

13. The device according to claim 12, wherein the device is configured to execute commands of a computer program to receive the environmental data, ascertain the driving area and the prohibited area, determine whether the bottleneck exists, ascertain the trajectory, and operate the automated vehicle.

14. The device according to claim 13, wherein the computer program is stored on a machine-readable storage medium.

* * * * *